Figure 1:
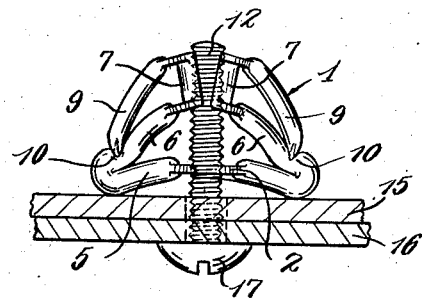

Dec. 12, 1944.  J. W. SIMMONS  2,364,668
RESILIENT FASTENER
Filed Oct. 15, 1943  2 Sheets-Sheet 1

INVENTOR,
BY John W. Simmons
Hull & West
ATTORNEYS

Dec. 12, 1944.  J. W. SIMMONS  2,364,668
RESILIENT FASTENER
Filed Oct. 15, 1943  2 Sheets-Sheet 2

INVENTOR,
BY John W. Simmons
Hull & West
ATTORNEYS

Patented Dec. 12, 1944

2,364,668

UNITED STATES PATENT OFFICE 2,364,668

RESILIENT FASTENER

John W. Simmons, Cleveland Heights, Ohio

Application October 15, 1943, Serial No. 506,385

16 Claims. (Cl. 85—32)

My present invention relates to improvements in resilient fasteners or so-called "speed nuts," and in certain aspects is a projection of the idea or principle incorporated in the fastener described and claimed in my copending application Serial No. 485,607, filed May 4, 1943.

An object of the invention is the production of a resilient fastener that is capable of being readily applied to a screw, bolt, or other entering element, and that will, when compressed, as by turning the entering element, provided the same is threaded, exert an extremely powerful hold thereon.

While I show in the accompanying drawings and shall proceed to describe in detail embodiments of the invention that are especially adapted for use with screws or bolts of standard type, I wish it to be understood that the invention is not necessarily limited to use with threaded entering elements. Where threaded elements are employed, the compression of the fastener is effected by turning the element in an appropriate direction, as above suggested, whereas, when the fastener is used with smooth studs or the like, it has to be otherwise compressed axially of the same.

Another general object of the invention is to provide a resilient fastener that is very simple of construction and inexpensive of manufacture, being comparable in these respects to the simplest and cheapest of prevailing fasteners of the same class, but which possesses much greater strength, durability and holding power than such predecessors.

A further object of the invention is to provide a resilient fastener or speed nut that may be simply and economically produced from linear material, such as wire or strip metal, and which has a multiple thread contact, or its equivalent, with each of the opposite sides of an entering element, such as a screw or bolt, wherewith it is used, thereby to materially increase its holding power over that of resilient fasteners capable of only single point or thread contact with each side of an entering element.

Another object of the invention is to provide a fastener of the class in question constructed of an elongate piece of material, the fastener being so designed that said piece of material may be punched or otherwise treated to allow passage of an entering element through the plane thereof and may be serrated to provide multiple tooth or thread contact with the opposite sides of such element, all while the piece is in flat or substantially flat condition, the same thereafter being shaped to the form of the finished article.

A still further object comprehended by the invention is the provision of a resilient fastener so designed that the linear material from which it is constructed may be corrugated, cross-ribbed or serrated, as by a coining, cutting or rolling operation, throughout its entire length and thereafter cut into pieces of the required length, perforated and formed to produce the fastener. By thus corrugating the material or cross-ribbing or serrating it on one side and shaping it in accordance with my invention, not only are the opposed multiple thread contact portions provided, but a toothed base is obtained which tends to prevent slippage of the fastener on objects against which it is clamped when in use.

Another object of my invention is to provide a quick-acting fastener or speed nut constructed of resilient metal and an impressionable material, such as lead, fiber or plastic, similar to the combination disclosed and claimed in my copending application Serial No. 484,022, filed April 22, 1943, the instant construction being peculiarly adapted to the inclusion of such a feature. The purpose of this combination, as is well known to those acquainted with the art, is to so increase the frictional contact between the threads of the entering element and the fastener that the connection will not loosen under heavy vibration.

While I show and describe herein several embodiments of the invention, I wish it to be understood that these embodiments are illustrative and are not intended as limiting the invention to the shapes and structural details thereof further than required by the terms of the appended claims.

Figure 2:
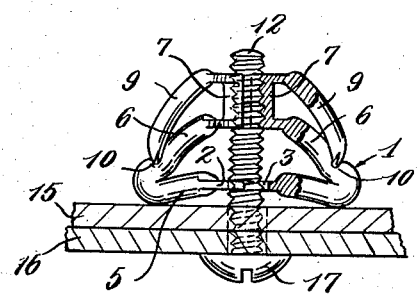
Figure 4:
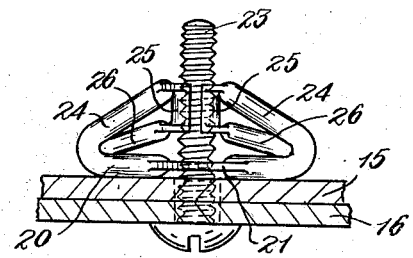
Figure 3:
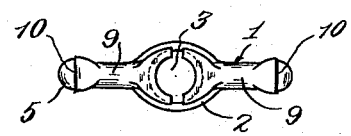
Figure 5:
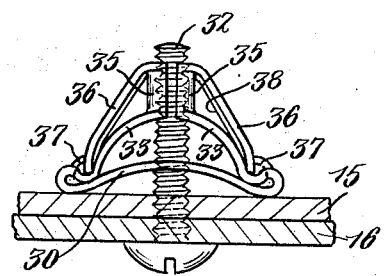
Figure 6:
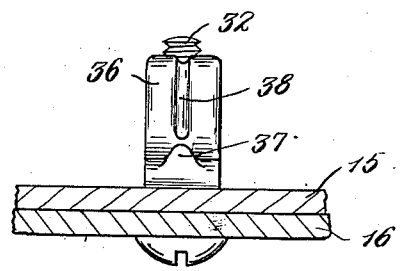
Figure 7:
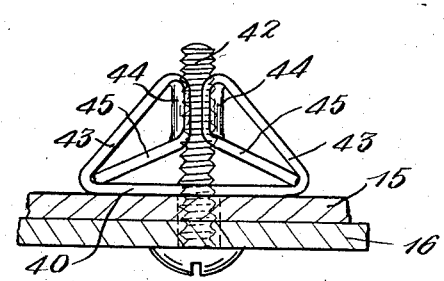
Figure 8:
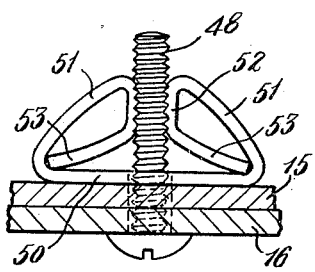
Figure 11:
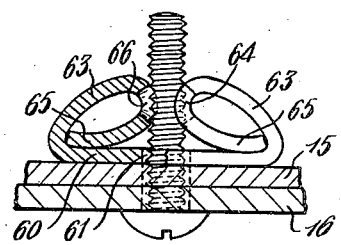
Figure 12:
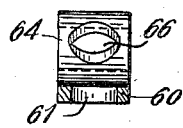
Figure 9:
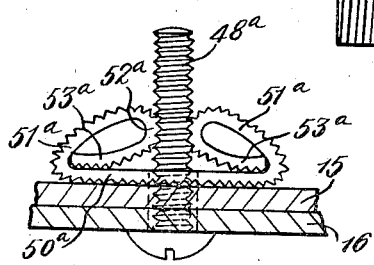
Figure 10:
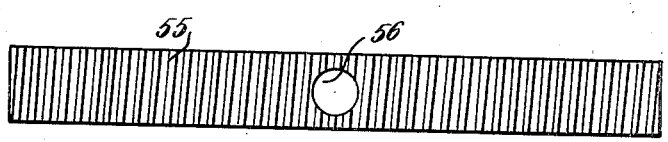
Figure 13:
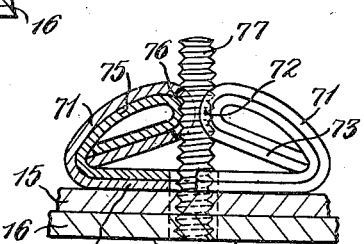
Figure 14:
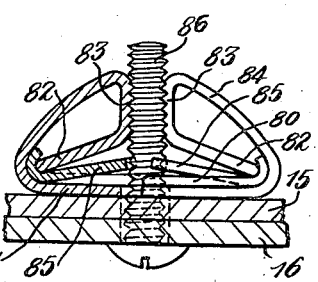
Figure 15:
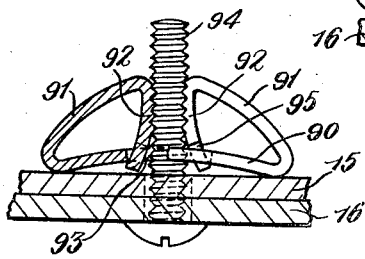
Figure 16:
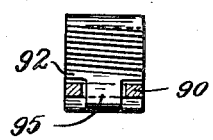
Figure 17:
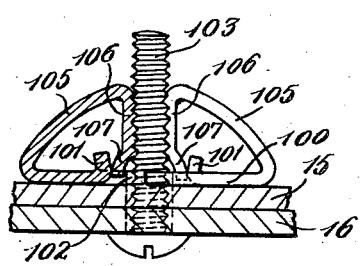

In the drawings, Fig. 1 is a side elevational view of a resilient fastener constructed of wire in accordance with the invention and shown as applied to a threaded bolt represented as holding two members together, the fastener being in relaxed condition; Fig. 2 is a view similar to Fig. 1, showing the fastener under compression and with parts thereof in section; Fig. 3 is a plan view of the fastener; Fig. 4 shows a modified form of the fastener, constructed of wire as in the preceding views; Fig. 5 is a view, similar to Fig. 2, illustrating a strip metal construction; Fig. 6 is an elevational view of the same at right angles to Fig. 5; Fig. 7, and the remaining views, show further modifications of the invention in which strip metal is employed, the present view showing the fastener in side elevation; Fig. 8 shows a form of the invention in which the opposed element-engaging portions or jaws are comparatively straight across and serrated for holding engagement with the entering element; Fig. 9 shows a form of the invention distinguished from that illustrated in Fig. 8 by the strip of material from which the fastener is formed being serrated or corrugated throughout its length; Fig. 10 is an elevational view of the strip of material from which the fastener of Fig. 9 is constructed before the strip is shaped into the finished article; Fig. 11 is a side elevational view of a fastener, partly in section, constructed of a strip of material in which holes are punched to provide multiple holding parts for engagement with longitudinally spaced parts of the entering element; Fig. 12 is a central transverse section through the fastener shown in Fig. 11; Fig. 13 is a side elevational view, partly in section, of a modification of the invention incorporating a member of impressionable material and otherwise having the form of the invention illustrated in Fig. 11; Fig. 14 is a side elevational view of a form of the fastener, similar to that illustrated in Fig. 8, in which a member of impressionable material, such as fiber, is incorporated; Fig. 15 is an elevational view, partly in section, of another form of the invention; Fig. 16 is a central transverse section through the fastener shown in Fig. 15, and Fig. 17 illustrates a further modification.

In Figs. 1 to 3 is shown a fastener, designated generally by the reference numeral 1, that is made from a piece of wire of the required length, which may have the usual circular or any other suitable cross sectional shape, and at its longitudinal center the piece of wire is flattened, as indicated at 2, and punched or otherwise perforated to provide a hole 3.

A base 5 is set off midway of the length of the piece of wire by adjacent parts 6 that are turned back over and are disposed at an angle to the base; and joining the parts 6 at their ends remote from the base are element contacting portions or jaws 7. These portions or jaws are formed by flattening the wire and then preferably curving it transversely to substantially semi-cylindrical form. The inner surfaces of the portions or jaws 7 are shown as provided with serrations in the nature of threads that desirably correspond in size and pitch approximately to the threads of screws or bolts with which the fastener is intended to be used. The serrations may be formed in the material by an operation known as "coining." Struts 9 extend from the upper ends of the portions or jaws 7 and are inclined toward the ends of the base where their terminals are engaged within seats 10 shown as depressed within the parts 6 adjacent their junction with the base.

It is apparent from the foregoing description that this embodiment of the invention provides a resilient fastener or nut that is truss-like in character, and in use it may be slipped over a screw or bolt that constitutes the entering element, designated 12 in Figs. 1 and 2, the proportions of the fastener and element preferably being such as will cause frictional engagement of the jaws or portions 7 with the entering element as the fastener is slipped over the latter. For the purpose of the present illustration, the element 12 is shown as connecting together two members 15 and 16 having registering holes through which the element is projected. These members are designated by the same reference characters throughout the drawings, regardless of the modifications of the invention with which they are associated. With the parts in the condition illustrated in Fig. 1, a screw driver may be applied to the slotted head 17 of the element 12 and the latter turned in a direction to feed the jaws or portions 7 axially of the element toward the member 15, this operation continuing until the fastener is under compression and assumes the condition illustrated in Fig. 2, when the members 15 and 16 will be firmly clamped between the base and head 17.

The fastener illustrated in Fig. 4 is also constructed of a piece of wire and comprises a base 20, flattened at its longitudinal center, as shown at 21, and perforated for the passage of the entering element 23. Beyond the ends of the base 20 the piece of wire is bent upwardly and inwardly at an acute angle to the base to provide parts 24 that join at their upper ends element engaging portions or jaws 25, similar to those of the previously described modification, and struts 26 extend from the lower ends of said portions or jaws to the angles or bights between the base and parts 24 where their terminals are engaged within the seats provided by such angles or bights.

As will be readily appreciated, the form of the invention shown in Fig. 4 provides a strong yet simple truss-like structure that is capable of very high compression and accordingly possesses great holding power.

The modification illustrated in Figs. 5 and 6 differs from the first described form principally in the fact that it is made of sheet metal in strip form, sometimes called ribbon stock. The fastener at present under consideration comprises a base 30, having a hole at its center for the passage of the entering element 32. Beyond the ends of the base, the strip of material is bent back over the base and inclined upwardly and inwardly from the ends thereof to provide parts 33 that merge into the opposed element engaging portions or jaws 35. Extending laterally and thence downwardly in diverging relation to each other from the upper ends of the portions or jaws 35 are struts 36 that have their terminals engaged within seats formed in the parts 33 adjacent their junction with the base and which seats are defined by lugs 37 that are struck from the parts 33. Longitudinal ribs 38 may be depressed in the struts 36 for the obvious purpose of imparting stiffness thereto.

The form of the invention illustrated in Fig. 7 is similar to that shown in Fig. 4, the only essential difference between the two being in the form of the material from which they are made. The fastener shown in Fig. 7 is constructed of strip metal and comprises the base 40 that is perforated for the passage of the entering element 42 and is turned upwardly and inwardly at each end to form the parts 43 which join, at their upper ends, the element contacting portions or jaws 44. At their lower ends said portions or jaws merge into the struts 45 that have their terminals engaged within the seats formed by the angles or bights between the base 40 and the parts 43. The portions or jaws 44 are substantially semi-cylindrical, as in the previously described forms, and are serrated on their inner sides to correspond approximately with the threads of the entering element 42. To impart stiffness to the structure, the semi-cylindrical formation may be carried on through the parts 43 and/or struts 45 and, if desired, throughout the entire length of the strip from which the fastener is constructed. Such a modification is so readily understood that specific illustration is deemed unnecessary.

In the fabrication of the fastener shown in

Fig. 8, the end portions of the strip of material from which it is made are formed into loops and the loops are turned inwardly over the part of the strip that constitutes the base 50, said looped end portions including parts 51, element contacting portions or jaws 52 and struts 53, the terminals of the latter engaging within the bights between the base 50 and the parts 51. The base 50 is perforated for the passage of an entering element, and desirably prior to formation of the strip, it is cross-ribbed or corrugated, as by a coining or other suitable operation, in the regions that shall ultimately constitute the element contacting portions or jaws 52.

In Fig. 9 is shown a fastener that is practically identical with the one just described, wherefore the corresponding parts of the two fasteners are designated by the same reference numerals, those associated with Fig. 9 being augmented by the exponent $a$. The essential difference between the two fasteners resides in the fact that the strip of material from which the one shown in Fig. 9 is fabricated has cross-ribs or transverse serrations throughout one of its wider faces, and when the strip is formed to the shape of the fastener, the serrated surfaces of the element contacting portions or jaws $52^a$ are in opposed relation to each other, while the serrated surface of the base $50^a$ is on the underneath side of the base where it contacts the member 15, thus tending to prevent relative movement between the fastener and said member. The strip, prior to formation, is shown in Fig. 10, where it is designated 55; and the hole for the passage of the entering element $48^a$ is designated 56.

In Figs. 11 and 12 is shown a fastener of practically the same style as those of Figs. 8 and 9. The base 60 of the present fastener is provided with a hole 61 for the passage of the entering element 62, and its looped ends, comprising the parts 63, jaws 64 and struts 65, are provided with holes 66 in the region of the jaws. The edges of the material, at the top and bottom of each hole 66, form teeth for contact with longitudinally spaced parts of the entering element. While I have shown the holes 66 as circular, they may be oblong in a lateral direction, rectangular, or of any other suitable shape, with their top and bottom edges inclined to correspond approximately to the pitch of the threads of the entering element, if desired.

The fastener shown in Fig. 13 is of a composite nature, and in form resembles that of the fastener illustrated in Figs. 11 and 12. Combined with the strip of relatively hard resilient metal that comprises the base 70, the parts 71, element engaging portions or jaws 72 and struts 73, is a strip 75 of impressionable material, such as lead or fiber; and where the portions or jaws 72 are perforated to provide the holes 76, similar in purpose to the holes 66 of the previously described modification, enough of the material of the strip 75 is exposed to the entering element 77 to allow the threads of the latter to impress themselves in said material. Therefore, as the fastener is compressed by the turning of the threaded entering element, friction additional to that between the portions or jaws 72 and the entering element is created that tends to prevent loosening of the parts from shock or vibration, the usual spring action of the resilient fastener being augmented by the binding function of the impressionable material.

Combined with the fastener shown in Fig. 14, which resembles the form of the invention disclosed in Fig. 8, is a member 80 of suitable impressionable material, such as fiber, the same having a body portion that extends along the base 81 of the fastener and has its ends clamped between the outer ends of the struts 82 which, with the element engaging portions or jaws 83 and parts 84 make up the looped ends of the fastener. The member 80 includes tongues 85 that are forced against the opposite sides of the entering element 86 as the fastener is compressed. Under extreme compression, the tongues 85 are engaged and depressed by the struts 82.

In the composite forms of the fastener, as illustrated in Figs. 13 and 14, the ends of the struts are cushioned in the relatively firm impressionable material, and the yielding of said material increases the compressibility of the fastener as a whole and enhances its grip upon the entering element. Also, an advantage realized in the forms of the invention in which the end portions of the strip of material are looped over, inwardly and downwardly, is the avoidance of sharp bends adjacent the ends of the base which, with some materials, might weaken the structure.

The fastener illustrated in Figs. 15 and 16 comprises a base 90, desirably slightly arched from end to end, and beyond the ends of the base the end portions of the strip of material are turned inwardly over the base and thence downwardly toward the central portion thereof to provide the parts 91 and the element engaging portions or jaws 92. The hole 93 in the base, for the accommodation of the entering element 94, is desirably elongated, or additional apertures may be provided, and the ends of the strip are reduced in width and projected into said hole or said apertures, thereby to provide short struts 95 that have bearing against the end walls of such hole or apertures.

Fig. 17 shows a modification of the invention wherein the base 100 is provided with upwardly diverging lugs 101 that may be formed from parts struck from the base when the aperture 102 is punched for the passage of the entering element 103. Parts 105 extend upwardly and inwardly from the ends of the base and join the upper ends of the element contacting portions or jaws 106, and the terminals of the strip of material are suitably shaped to provide bearing portions or struts 107 that engage the inner surfaces of the lugs 101. The shape and disposition of the struts and lugs are such that a camming action is created as the fastener is compressed that increases the binding of the portions or jaws 106 upon the entering element.

By reason of the formation or construction of my improved fastener, it possesses greater flexibility than former types of speed nuts or fasteners made of metal of corresponding resiliency, and this results in extreme ease of attachment, and without the necessity of using special tools for the purpose, as is required with many of its predecessors. This remark applies, of course, to fasteners of the popular range of sizes, and not to those made for especially heavy duty where relatively stiff or heavy gage metal is employed.

Also, the extreme holding power or efficiency resulting from the formation or construction of my improved fastener permits relatively soft metal to be used in its manufacture without subsequent hardening unless, as above, the fastener is to be subjected to especially heavy work.

Having thus described my invention, what I claim is:

1. An article of the class described constructed of an elongate piece of material and comprising a base, a part turned back over the base and incorporating at its end remote from its junction with the end of the base an element contacting portion provided with a plurality of serrations for engagement with a number of longitudinally spaced parts on one side of an entering element, an abutment substantially fixed with respect to the base in opposed relation to said side of the entering element and wherewith the terminal of said turned back part engages, and a second element contacting portion sustained by the base in opposed relation to the first mentioned contacting portion, the base having a formation to allow clearance for an entering element that is adapted to be projected through the plane of the base and engaged between the aforesaid element contacting portions.

2. An article of the class described comprising a base having a formation to allow clearance for the passage of an entering element through, and in a direction substantially normal to, the plane of the base, a three-sided truss-like structure connected at the junction of two of its sides to and extending from one end of the base back over the base, one of the three sides of said truss-like structure providing an element contacting portion that is located at the end of said structure remote from its connection with the base, and a second element contacting portion sustained by the base in opposed relation to the former element contacting portion.

3. An article of the class described constructed of an integral elongate piece of material and comprising a base formed to allow clearance for the passage of an entering element through, and in a direction substantially normal to, the plane of the base, a part of said piece of material beyond one end of the base being turned back over the base at an angle thereto, an element contacting portion joining the end of said part remote from the base, a strut extending from the end of said portion remote from the aforesaid part, a seat in proximity to the junction of said part and the base wherewith the terminal of the strut is engaged, and an element contacting portion supported by the base in opposed relation to the first mentioned element contacting portion.

4. An article of the class described constructed of an elongate piece of material and comprising a base formed to allow clearance for the passage of an entering element through, and in a direction substantially normal to, the plane of the base, parts of said piece beyond the ends of the base being extended back over the base at an angle thereto, element contacting portions joining the ends of said parts remote from their junction with the base, struts extending from the ends of said portions remote from the aforesaid parts, and seats in proximity to the junction of said parts and the base wherewith the terminals of the struts are engaged.

5. An article of the class described constructed of an elongate piece of material and comprising a base formed to allow clearance for the passage of an entering element through, and in a direction substantially normal to, the plane of the base, parts of said piece beyond the ends of the base being extended back over the base, element contacting portions joining the ends of said parts remote from their junction with the base, struts extending from the ends of said portions remote from the aforesaid parts, and bearing parts wherewith the terminals of the struts are engaged.

6. An article of the class described constructed of an elongate piece of material and comprising a base formed to allow clearance for the passage of an entering element through, and in a direction substantially normal to, the plane of the base, parts of said piece beyond the ends of the base being extended back over the base, element contacting portions joining the ends of said parts remote from their junction with the base, and bearing parts in substantially fixed relation to the base wherewith the terminals of said piece of material engage.

7. An article of the class described comprising a base having a formation to allow clearance for the passage of an entering element through, and substantially normal to, the plane of the base, a three-sided truss-like structure connected at the junction of two of its sides to and extending from each end of the base back over the base, and an element contacting portion provided by a side of each of said structures at the end thereof remote from its connection with the base.

8. An article of the class described having a truss-like formation and comprising a base, compression members extending from each end of the base inwardly over the base at an angle thereto, said members incorporating element contacting portions of appreciable length that terminate in struts, the element contacting surfaces of said portions being in approximately right angular relation to the plane of the base, and abutments in substantially fixed relation to the base wherewith said struts engage, the base having a formation to allow, at substantially its longitudinal center, clearance for an entering element that is adapted to be projected through the plane of the base for engagement between said contacting portions.

9. An article of the class described constructed of an elongate piece of material and comprising a base having an aperture substantially midway of its length for the passage of an entering element, parts of said piece beyond the ends of the base being turned back over the base at an angle thereto and formed therebeyond into jaws for engagement with opposite sides of the entering element, struts extending from the ends of said jaws remote from the aforesaid parts, and seats in proximity to the junction of said parts and base wherewith the terminals of the struts are engaged.

10. An article of the class described constructed of an elongate piece of strip metal and comprising a base having an aperture through which an entering element is adapted to be projected, parts of said piece beyond the ends of the base being turned back over and inclined away from the base, portions of the piece adjoining the ends of said parts remote from the base being formed to provide jaws between which the entering element is adapted to be engaged, and struts extending from said portions, the terminals of said struts being interengaged with parts of said piece adjacent the ends of the base.

11. An article of the class described constructed of an elongate piece of strip metal and comprising a base having an aperture through which an entering element is adapted to be projected, parts of said piece beyond the ends of the base being turned back over and inclined away from the base, and adjoining portions of the piece being shaped to provide jaws having serrations on their inner sides, struts extending from the ends of said jaws remote from the aforesaid parts, said struts having longitudinally extending beads, and lugs struck from the piece of material in juxtaposition to the junction of the aforesaid parts and base providing seats in which the terminals of the struts are engaged.

12. An article of the class described constructed of an elongate piece of material and comprising a base, a part turned back over and inclined upwardly and inwardly from the end of the base and thence downwardly, to provide an element contacting portion, and finally outwardly and downwardly with its terminal bearing within the bight between the base and aforesaid part, a second element contacting portion sustained by the base in opposed relation to the first mentioned contacting portion, the base having a formation to allow clearance for an entering element that is adapted to be projected through the plane of the base and engaged between the aforesaid element contacting portions.

13. An article of the class described constructed of an elongate piece of ribbon-like material having transverse serrations continuously along one of its broad faces, the strip being shaped to provide a base and a looped end portion turned back over the base so as to provide a part that is generally inclined upwardly and inwardly over the base and thence downwardly, to provide an element contacting portion and finally outwardly and having its terminal seated within the bight between the base and aforesaid part, the strip being so disposed that the beforementioned serrations are on the bottom of the base and on the element contacting surface of the aforesaid contacting portion, a second element contacting portion sustained by the base in opposed relation to the one just mentioned, the base having a formation to allow clearance for an entering element that is adapted to be projected through the plane of the base and engaged between the aforesaid element contacting portions.

14. An article of the class described constructed of an elongate piece of ribbon-like material having transverse serrations continuously along one of its broad faces, the strip being shaped to provide a base and looped end portions turned back over the base so as to provide parts that are generally inclined upwardly and inwardly over the base and thence downwardly, to provide opposed element contacting portions, and finally outwardly and having their terminals seated within the bights between the base and aforesaid parts, the strip being so disposed that the before-mentioned serrations are on the bottom of the base and on the opposed element contacting surfaces of the aforesaid portions, the base having a formation to allow clearance for an entering element that is adapted to be projected through the plane of the base and engaged between the aforesaid element contacting portions.

15. An article of the class described constructed of an elongate piece of material perforated at substantially its longitudinal center to provide a hole through which an entering element is adapted to be projected, the piece of material being shaped for a distance in opposite directions from said hole to provide a base, and beyond the ends of the base to provide substantially complete loops that extend inwardly over the base and the closed ends of which loops are disposed on opposite sides of the axis of said hole and constitute element contacting portions.

16. An article of the class described constructed of an elongate piece of material perforated at substantially its longitudinal center to provide a hole through which an entering element is adapted to be projected, the piece of material being shaped for a distance in opposite directions from said hole to provide a base, and beyond the ends of the base to provide substantially complete loops that extend inwardly over the base and the closed ends of which loops are disposed on opposite sides of the axis of said hole and constitute element contacting portions, the element contacting surfaces of said portions being serrated.

JOHN W. SIMMONS.